July 15, 1969 M. A. LARMUSEAU 3,455,231
OVEN FOR FOODS
Filed July 3, 1967
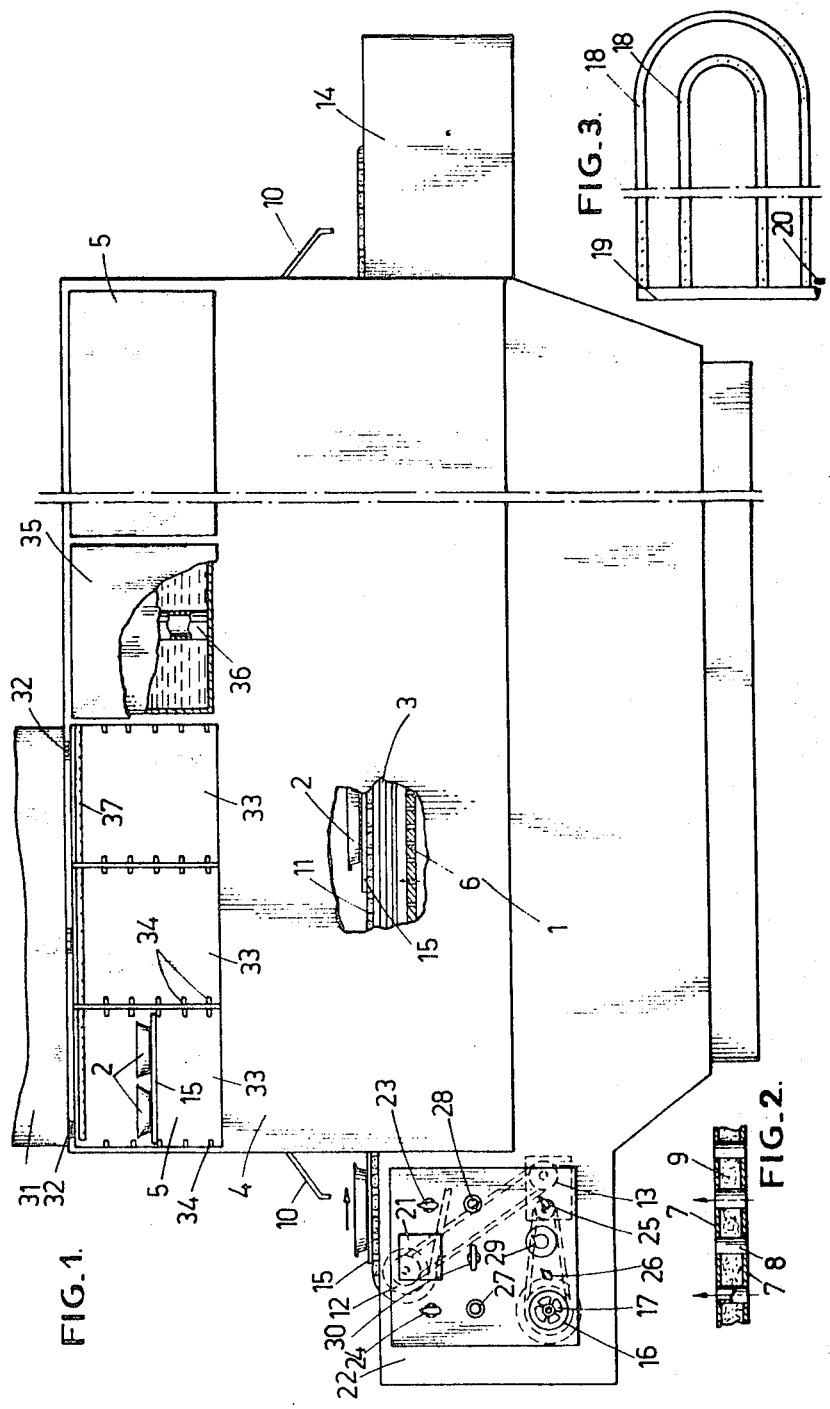

United States Patent Office 3,455,231
Patented July 15, 1969

3,455,231
OVEN FOR FOODS
Marc Auguste Larmuseau, 133 Zoutelaan,
Knokke, Belgium
Filed July 3, 1967, Ser. No. 651,002
Claims priority, application Belgium, July 7, 1966,
683,776
Int. Cl. A47j 27/04, 27/14
U.S. Cl. 99—339                                    4 Claims

ABSTRACT OF THE DISCLOSURE

An oven for foods provided in containers, in particular to warm up deep frozen foods, which may be located with advantage in canteens and the like; in order to prevent the foods from getting cold, there being provided at least one container receiving berth, air-conditioned by means of water vapour supplied by a perforated pipe connected to a tank partially filled with water, the bottom of the oven being perforated to admit the air needed for combustion.

---

The present invention relates to an oven for foods provided in containers, in particular to warm up deep frozen foods, comprising a heated tunnel and means for transporting the containers.

An oven of this type may be located with advantage in locations of heavy consumption, such as for example in schools, workshop canteens, etc. The invention has for its object to permit the temporary preservation of foods after they have been brought to the temperature of consumption, in order to prevent the foods from getting cold between the time when they have been warmed up and the time when the person in charge of issuing them is able to serve them. For that purpose, according to the invention, the oven comprises at least one air-conditioned container receiving berth.

According to one advantageous form of embodiment of the invention, the air-conditioning of the receiving berth is carried out by means of water vapour circulation inside a perforated pipe running through the berth.

Preferably the oven comprises, according to the invention, a tank partially filled with water, this tank being traversed by an exhaust pipe for the gases of combustion of the oven heating fuel, the tank comprising in addition at least one water vapour recovery pipe, which passes through the said berth where it is provided with perforations.

The invention has also for its object improved means for gas heating of the oven. For that purpose, according to the invention, the bottom of the oven is perforated, so as to admit the air needed for combustion.

According to a preferred form of embodiment of the invention, the oven comprises several runs of gas burners fed with gas at each of the ends thereof.

Other details and features of the invention will become apparent from the description, given hereinafter by way of non limiting example, of a form of embodiment of the invention, with reference to the drawing, wherein:

FIGURE 1 shows a diagrammatic elevational view partially broken away, of an oven for heating up foods according to the invention.

FIGURE 2 shows a fragmentary vertical section, on a larger scale, of the bottom of an oven according to FIGURE 1.

FIGURE 3 shows a diagrammatic plan view of runs of oven burners according to FIGURE 1.

In the different figures, the same reference numerals refer to identical members.

The oven comprises a lower oven portion 1, in the shape of a tunnel wherein are provided means for transporting dishes 2 containing foods and means 3 for heating the tunnel as well as an upper oven portion 4, comprising several air-conditioned berths 5.

The bottom 6 of the lower oven portion comprises two sheets 7 mounted one on top of the other and kept spaced by means of lengths of pipe 8 permitting the air to circulate freely into the oven. A heat insulating material 9 such as glass wool fills the space remaining between the two sheets 7.

The upper oven portion is separated from the lower portion by a partition the ends 10 of which determine the entry and the exit of the tunnel.

The transport means for the dishes 2 comprises two endless chains 11 passing, on the one hand, over pulleys 12, driven, through a speed reduction gear 13, by a motor 16 and, on the other hand, over reversing sheaves mounted inside a casing 14. The speed may be set by means of a cone pulley the diameter of which may be adjusted by means of a hand-wheel 17.

The dishes 2 are laid out on rectangular service grids 15 able to carry several dishes.

The tunnel heating means comprise a series of perforated runs 18, each of horseshoe shape, opening at either end thereof into a common duct 19 for the supply of gaseous fuel mixture, provided with a pilot-light 20, and being connected to an automatic feed and safety valve 21 mounted inside a control case 22; this control case also comprises the hand wheel 17 for adjusting the diameter of the cone pulley, a main gas admission cock 23 connected to the valve 21 and to a hand feed bypass cock 24 that enables the runs 18 to be supplied with fuel in case of a breakdown of the automatic valve, a main electricity supply switch 25, a switch 26 for the current supply to the motor 16, an indicating lamp 27 for the motor electric circuit, an indicating lamp 28 for the electric circuits of the safety valve 21, a thermostat 29 and a relighter 30 for the runs 18 mounted at the end of a flexible tube.

Above the upper partition of the tunnel 1, the oven is provided with several berths 5 the entry of which is located on one of the side faces of the oven and may be closed by means of a door 31 mounted on hinges 32. Each berth 5 is partitioned off and each compartment 33 is provided with strips 34 to support the grids 15.

Between two berths 5 a tank 35 partially filled with water is provided in the oven, through which is led a pipe 36 wherein pass the gases of combustion originating from the tunnel, which are exhausted to a stack. From the tank 35 is led to each of the adjacent berths 5 a tube 37 for the circulation of the steam produced inside the tank. This tube is perforated, so that the berths 5 are kept at a selected level of temperature and humidity.

The perforated bottom 6 offers the advantage of providing a convenient admission of air needed for combustion, while the feed of the runs of burners from either end thereof assures a reduction of the risks of obstruction of the tubes and consequently of explosion.

I claim:
1. An oven for foods provided in containers, in particular to warm up deep-frozen foods, comprising a tunnel, conveyor means extending through said tunnel for transporting said containers through said tunnel, combustion heating means in said tunnel, at least one exhaust conduit for the combustion gases leading from said tunnel, at least one storage berth, separated from said tunnel, for containers which have passed through said tunnel, a perforated pipe running through said berth, a tank partially filled with water, said combustion gas exhaust conduit passing through said tank to generate steam, and said perforated pipe being connected to said tank to recover the steam generated in the tank and circulate it to said berth.

2. An oven as claimed in claim 1, wherein said tunnel has a top partition, at least two berths being arranged above said top partition, said tank being arranged between two berths and having two steam circulation pipes with each pipe leading to one berth.

3. An oven as claimed in claim 2 further comprising container supporting grids adapted to be carried by the tunnel conveyor means and by supporting members arranged in the berths.

4. An oven as claimed in claim 1, wherein said tunnel has a bottom, runs of gas burners being arranged between said conveyor means and said bottom, said bottom comprising two plates spaced one from the other with heat insulating material filling the space between the plates, and passages extending through said bottom to allow combustion air to enter beneath said gas burner runs.

References Cited

UNITED STATES PATENTS

| | | | |
|---|---|---|---|
| 42,442 | 4/1864 | Martin | 126—20 |
| 422,598 | 3/1890 | Laney | 126—31 |
| 806,266 | 12/1905 | King | 99—362 |
| 840,220 | 1/1907 | Kane | 431—278 |
| 947,779 | 2/1910 | Adams | 126—20 |
| 1,349,784 | 8/1920 | Saunders | 126—20 |
| 1,551,532 | 9/1925 | Axtell et al. | 431—278 |
| 2,566,524 | 9/1951 | Kammins | 99—339 XR |
| 3,039,379 | 6/1962 | Brown et al. | 99—362 |
| 2,579,827 | 12/1951 | Johnson | 99—339 |

FOREIGN PATENTS 722,604    11/1965    Canada.

ROBERT W. MICHELL, Primary Examiner

ARTHUR O. HENDERSON, Assistant Examiner

U.S. Cl. X.R.

99—362